April 29, 1947.  W. A. BULGER  2,419,626
HEATER
Filed Jan. 29, 1943  3 Sheets-Sheet 1

INVENTOR
WILLIAM A. BULGER
BY
ATTORNEY

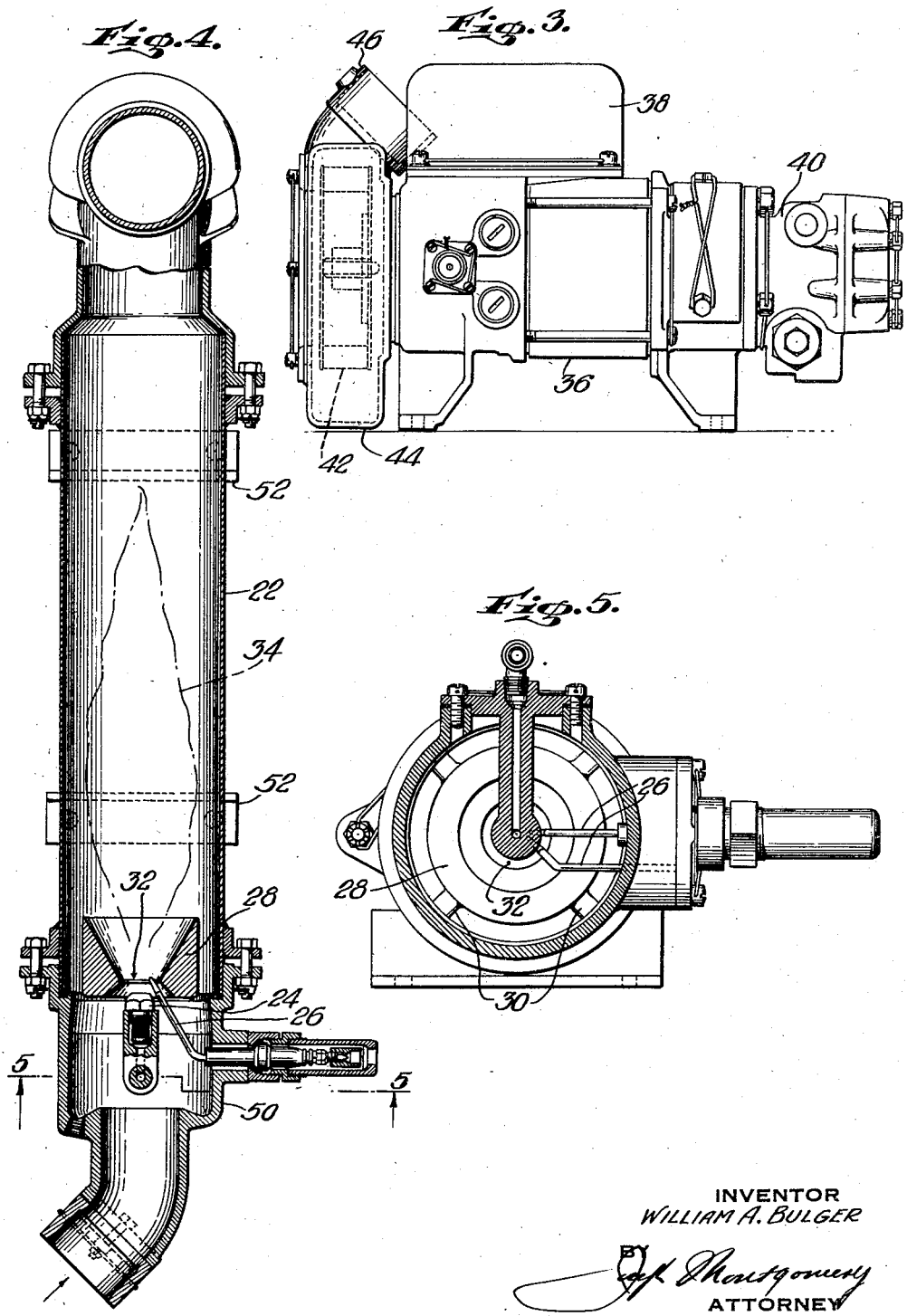

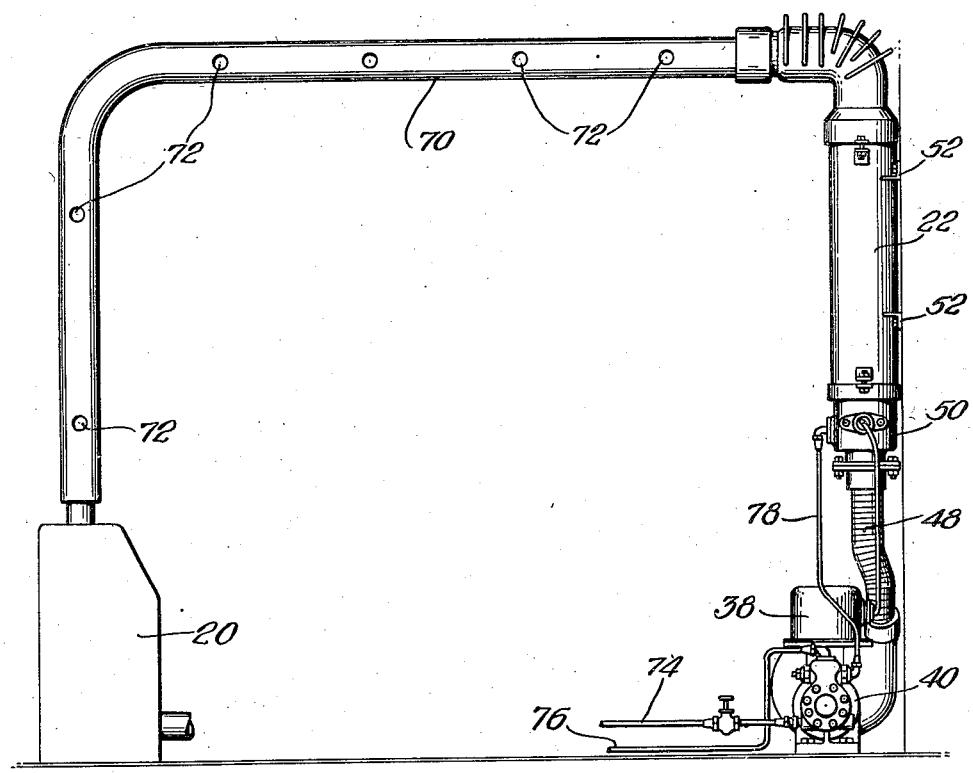

Patented Apr. 29, 1947

2,419,626

UNITED STATES PATENT OFFICE 2,419,626

HEATER

William A. Bulger, Stamford, Conn., assignor to Petroleum Heat and Power Company, New York, N. Y., a corporation of Delaware Application January 29, 1943, Serial No. 473,965

8 Claims. (Cl. 123—142.5)

This invention relates to improvements in heaters and is particularly directed to heaters employing liquid fuel burners wherein the heat of the gases of combustion is directed to the elements to be heated.

The heater of the present invention is particularly well adapted for heating the engine compartment, engines, lubrication oil and other parts of military vehicles such as armored tanks and the like. The invention however is not limited to such use as obviously it has manifold applications as will be apparent from the following description.

When military vehicles such as armored tanks are to be used in arctic regions or other places where extreme sub-zero temperatures may be encountered it becomes necessary to warm up the engines and lubricating oil whereby the engines readily may be started and efficient operation maintained. In such vehicles space for heaters is very limited and any heater employed must have a capacity of approximately 100,000 B. t. u's. per hour, hence ordinary or conventional heaters can not be employed. Other inherent difficulties which prohibit the use of conventional heaters in such vehicles result from the fact that the heater must be operated from the batteries in the armored vehicles; the lack of a chimney for providing draft or removing gases of combustion; the close proximity of the heat to other vital parts of the engine due to the crowded conditions in the engine compartment of such vehicles requiring that temperatures generated within the heater and the hot air and gases leaving the same should be below the point where they would be likely to cause damage to any part of the engine; and the fact that all working parts of the heater mechanism must be independent of lubrication other than that provided by the fuel itself whereby to insure proper operation of the heater under sub-zero temperatures.

By the present invention I have been able to overcome all of the aforerecited difficulties.

One of the objects of the present invention is the provision of a compact heater, of rugged construction, offering rugged performance without necessitating skilled attention or expensive maintenance, and which is capable of burning the required quantity of fuel in an extremely small space.

Another object of this invention resides in the provision of a heater of the character indicated wherein the heated air and gases of combustion are conducted through duct work or manifolds and directed against the various parts of the engine. This as will be appreciated results in the building up of considerable back pressure. My improved heater, however, is capable of not only starting under this back pressure but it is capable of operating efficiently, and if necessary, continuously thereunder.

Another object of the present invention resides in the provision of a heater so constructed that it is capable of burning fuel in the presence of approximately six times the amount of air normally required for combustion. This is practically impossible with any of the known types of liquid fuel burners as the velocity of the air and atomized fuel would be far greater than the rate with which combustion takes place using air as a means of supplying oxygen for the combustion of the fuel.

Other objects of the present invention reside in the provision of a heater of the character indicated wherein combustion is initiated in the normal manner and wherein the flame is retained in its normal position at the same time permitting the introduction of great quantities of excess air over that required for combustion while controlling the same so that the flame initiated will not be carried away by the high velocity.

One of the principal features of the heater of the present invention is a novel modified venturi arrangement so proportioned with respect to the tubular housing of the burner that only the proper amount of air from the high blast supplied by the air blower intermingles with the atomized fuel at the point of ignition, the balance of the blast of high velocity air traveling around the outside of the venturi where it performs the dual function of tempering the flame after combustion has been reasonably well established and of providing a complete air curtain around the flame. This curtain or air screen around the flame contracts the flame very severely which keeps the temperature of the combustion chamber down to a safe point and also provides a rapid interchange of heat between the flame and this air curtain so that within a relatively short distance complete mixture and diffusion of the hot gases of combustion and this air screen takes place, resulting in the delivery of heated air and gases at temperatures low enough to be safe for operation within the engine compartment of such vehicles.

The present invention also provides a novel method of burning liquid fuel in heaters of the character indicated.

Still further objects of the present invention and its capability of manifold applications will be manifest from the following description and the accompanying drawings.

In the drawings:

Fig. 3 is an elevational view of the power unit for the heater;

Fig. 4 is a longitudinal sectional view of the heater taken on line 4—4 of Fig. 1;

Fig. 5 is a view taken on line 5—5 of Fig. 4; and

Fig. 6 is an elevational view of a modification of the heater of Fig. 1.

Figure 1:
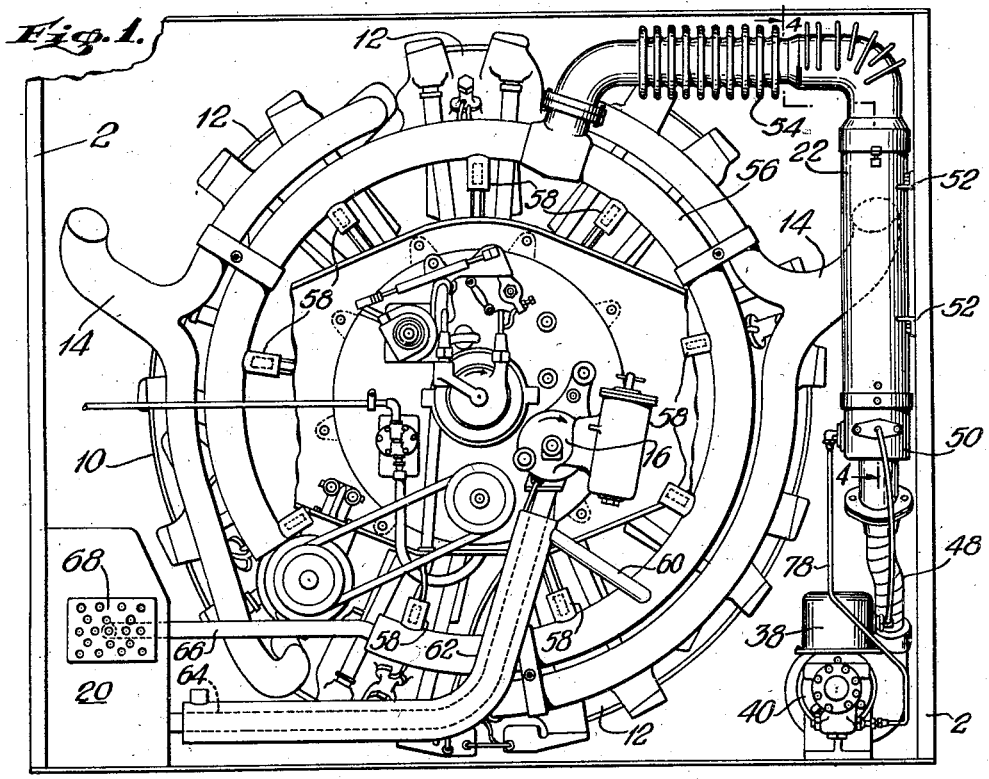
Fig. 1 is an elevational view of my improved heater connected to an internal combustion engine.
Figure 2:
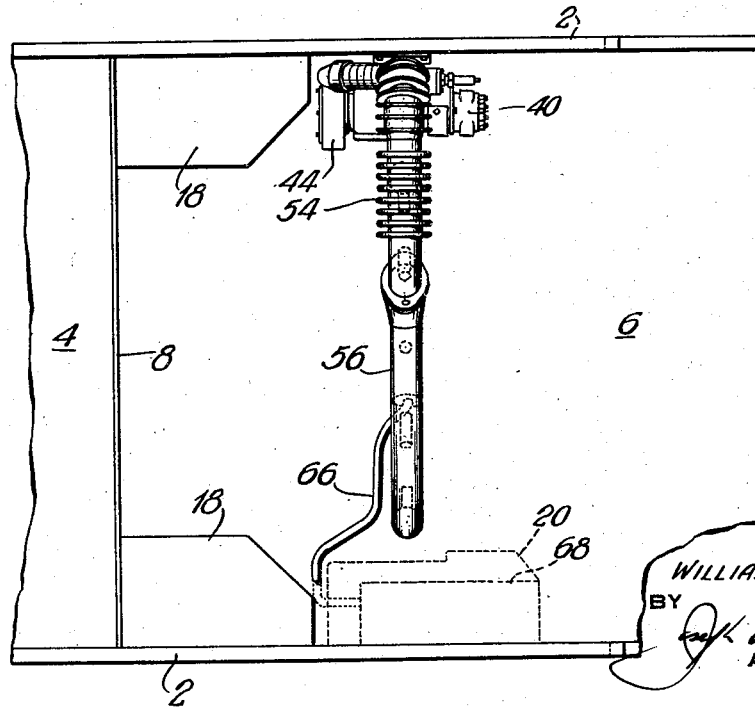
Fig. 2 is an elevational view of the heater showing its location in the engine compartment of an armored vehicle.

Referring to the drawings in detail 2 designates the side walls of an armored vehicle having a fighting compartment 4 and an engine compartment 6 separated from each other by partition 8. The compartment 6 houses an engine 10, which may be the conventional internal combustion engine having a plurality of cylinders 12, engine manifolds 14, lubricating oil pump 16 and other usual parts which do not form part of the present invention and accordingly need not be described.

The engine compartment 6 also encloses a motor fuel tank 18 and a lubricating oil tank 20. The tank 20 has a heat exchange unit therein which receives heat from the heater of the present invention in a manner to be described hereinafter.

The heater of the present invention comprises a cylindrical housing 22 enclosing a liquid fuel spray nozzle 24 having associated therewith the usual ignition electrodes 26.

Adjacent the burner nozzle 24 I provide a novel venturi 28 spaced from the walls of the housing 22 by supports 30 whereby to provide for the passage of air about the venturi as will be described presently. The venturi has a central opening 32 formed by opposed conical bores as shown in Fig. 4. As will also be seen from Fig. 4 the burner nozzle 24 projects slightly into the smaller of the conical bores. Air of combustion and the liquid fuel atomized by the nozzle pass through the opening 32 and combustion takes place adjacent the venturi providing a flame illustrated by broken lines 34 in Fig. 4.

The flame is contracted and confined to its position in the housing 22, in what may be termed the flame zone defined by the broken line 34, by a contiguous air screen comprising a continuous blast of air passing on the outside of the venturi. This air screen is confined to an air zone defined by the walls of the housing and the flame.

Inasmuch as the heater of the present invention is particularly adapted for use in armored vehicles I provide a power unit (shown in Fig. 3) comprising a battery operated D. C. motor with a generator in the housing 36 for supplying A. C. current to an ignition transformer 38. A flexible coupling is provided intermediate the motor and a combined fuel pump and pressure regulating valve is enclosed in the housing 40. The motor drives a fan 42 in blower housing 44 which housing is provided with an outlet 46 adapted to be connected by means of a flexible conduit 48 to the intake 50 of the heater housing 22.

The power unit just described preferably is secured to the floor of the engine compartment and the heater housing secured to the wall of the compartment by brackets 52 or other suitable means.

The outlet side of the heater housing in the form illustrated in Fig. 1, is preferably provided with a flexible conduit 54 in communication with a heater manifold 56 which is positioned adjacent the engine to be heated. In Fig. 1 the engine is of the rotary type hence the heater manifold 56 is circular and is provided with a plurality of air jets 58, one adjacent each of the cylinders 12.

The heater manifold is also provided with an outlet conduit 60 which communicates with a jacket 62 about oil line 64 leading from the lubricating oil tank 20 to the oil pump 16.

The heater manifold 56 terminates in an outlet conduit 66 which leads into a heat exchanger 68 in the lubrication oil tank 20 whereby the lubricating oil in the tank is heated.

In Fig. 6 I have illustrated one modification of my improved heater. In this form the burner and its component parts are similar to that shown in Fig. 1 hence the same reference numerals are applied thereto. It will be noted that the heater manifold 70 in this modification differs from the heater manifold 56 of Fig. 1. The heater of Fig. 6 with its associated heater manifold 70 may be employed in heating engines other than rotary engines as illustrated in Fig. 1, and in fact may be employed for conveying heated air and gases of combustion to any elements to be heated whether such elements be parts of an engine or not. The manifold 70 is provided with outlets 72 adjacent which the elements to be heated are positioned. It will be appreciated that if desired conduits may be connected to said outlets whereby the heated air or gases of combustion may be conveyed or conducted to the elements to be heated in the event such elements are remote from the manifold.

While I have illustrated and described but two forms of heater manifold it is to be understood that I do not wish to be limited to the particular manifold illustrated inasmuch as the present invention contemplates manifolds of any desired shape or configuration depending upon the use to which heater is to be put. Such manifolds serve also to heat the enclosed engine compartment as will be appreciated.

My improved burner is so designed that a liquid fuel independent of the motor fuel is not required. As a matter of fact in military motor vehicles employing my improved heater the motor fuel from the motor fuel tank is utilized in the burner. In this connection I have illustrated in Fig. 6 the fuel suction line 74 leading from the motor fuel tank to the intake side of the pump 40 and by pass return fuel line 76 from the pump to the motor fuel tank. The fuel line from the pump to the burner is designated 78. The saving in space and other advantages in burning motor fuel oil in the heater will be apparent.

It will be appreciated that the operation of the heater of the present invention does not require the attention of a skilled operator. To set the heater in operation it is merely necessary to throw the switch to the motor, thereby setting in operation the blower 42 to supply a great volume of air at high velocity to the burner and at the same time setting the fuel pump in operation to supply liquid fuel to the burner nozzle where the same is atomized. The throwing of the motor switch also makes contact for the ignition electrodes whereby the fuel is ignited.

The blower as hereinbefore mentioned supplies a large volume of air to the heater through the conduit 48. This air is divided by the venturi 28 which is so proportioned with respect to the housing 22 that only the proper amount of air necessary for combustion, from the high blast supplied by the blower, passes through the opening 32 therein and intermingles with the atomized fuel at the point of combustion, the excess being passed about the outside of the venturi into the air zone about the flame to provide an air screen which because of its high velocity serves to temper the flame as hereinbefore mentioned.

It will be appreciated that without the novel form of venturi of the present invention the flame initiated would be carried away immediately by such high velocity, the effect being comparable to blowing out a candle or match.

The air screen being contiguous to the flame the same is heated and the heated air and gases of combustion pass from the housing 22 through the heater manifold 56 where a portion of the same is forced out of the jets 58 whereby to impinge upon the cylinders 12 of the motor to heat the same. The heated air and gases of combustion passing out of the manifold 60 into the jacketed oil line 64 serves to heat the oil in that line and the heated oil and gases of combustion passing out of the end of the manifold through conduit 66 will supply heat to the exchanger 68 in the lubricating oil tank 20.

The heater of the present invention may be set in operation prior to attempting to start the engine when the vehicle is in cold regions or operation of the engine and heater may be initiated simultaneously. The heater may be operated not only in starting the engine but, if desired or deemed necessary, may be operated intermittently or continuously at the will of the operator whereby to maintain the engine compartment, the engine, the lubricating oil, oil line and other parts at the desired temperature.

While I have illustrated and described my improved heater as applied to heating the engines and other parts of armored military vehicles it is to be understood that I do not wish to be limited to that application of my invention as obviously my improved heater has many other applications. It is also to be understood that various changes and modifications may be made in the structure herein illustrated and described without departing from the spirit and scope of my invention.

What I claim is:

1. A heater for internal combustion engines and parts thereof comprising in combination a housing for the heater, a liquid fuel burner therein, a supply of liquid fuel, a fuel atomizer in said housing, ignition means adjacent said atomizer, a supply of high velocity air, a venturi in the path of said air for dividing the air and directing a sufficient quantity for combustion adjacent said atomizer, and the excess about the flame to provide an enclosing air screen therefor, a conduit for the heated air and gases of combustion, said conduit leading to the engine and provided with outlets and branches leading to parts of the engine and to the lubricating oil tank therefor whereby to heat the same.

2. In an internal combustion engine the combination of a heater, a housing therefor, a liquid fuel burner in said housing, a common supply of liquid fuel for said engine and said heater, a fuel atomizer in said housing, a supply of high velocity air, means in the path of said air for dividing the air and directing a sufficient quantity for combustion adjacent said atomizer, and the excess about the flame to temper and confine the same in its normal position in said housing, a conduit for the heated air and gases of combustion, said conduit leading from said housing to the engine and being provided with outlets and branches leading from the conduit to the parts of the engine and to the lubricating oil tank therefor whereby to heat the same.

3. In combination an internal combustion engine, a heater comprising a liquid fuel burner, a housing therefor, a spray atomizer for the fuel, ignition means adjacent said atomizer a common fuel supply for the engine and burner, a supply of lubricating oil for the engine, a jacketed oil line leading from said oil supply to said engine, an air blower for supplying air at high velocity, means in the path of said air for directing a sufficient quantity of air to said atomizer as air of combustion and directing the excess air about the flame to provide a flame-confining air screen, a manifold in communication with said housing for conducting the heated air and gases of combustion to individual parts of said engine and to said jacketed oil line whereby to heat the same.

4. In combination an internal combustion engine, a liquid fuel burner, a housing therefor, a spray atomizer for the fuel, ignition means adjacent said atomizer, a common fuel supply for the engine and burner, a supply of lubricating oil for the engine, a jacketed oil line leading from said oil supply to said engine, an air blower for supplying air at high velocity, a venturi in said housing and spaced from the walls thereof for directing a sufficient quantity of air to said atomizer as air of combustion and directing the excess air about the flame to provide a flame enclosing air screen, a conduit in communication with said housing for conducting the heated air and gases of combustion to individual parts of said engine and to said jacketed oil line whereby to heat the same.

5. A heater for internal combustion engines comprising in combination a liquid fuel burner, a housing therefor, a spray atomizer for the fuel, means for initiating ignition of the fuel, an air blower for supplying air at high velocity, a Venturi structure in the path of said air for directing a sufficient quantity thereof to said atomizer as air of combustion and directing the excess air about the flame to provide an air screen surrounding the flame for contracting the same and confining it to its normal position adjacent said atomizer, a lubricating oil tank, an oil line leading from said tank to the engine, a heater manifold in communication with said housing receiving air and gases of combustion, said manifold having a plurality of air jets adjacent the cylinders of the engine whereby the heated air and gases will impinge upon the surface of said cylinders, and auxiliary manifolds in communication with said heater manifold for conducting heated air to said lubricating oil tank and the said oil line whereby to heat the oil therein.

6. A heater for internal combustion engines comprising in combination a liquid fuel burner, a housing therefor, a spray atomizer for the fuel, means for initiating ignition of the fuel, an air blower for supplying air at high velocity, a venturi mounted in said housing and spaced from the wall thereof, said venturi being so positioned in the path of said air as to direct a sufficient quantity of air through a central opening in the venturi to said atomizer as air of combustion and to direct the excess air about the venturi to provide an air screen surrounding the flame for tempering the same and confining it to its normal position adjacent said atomizer, a heat exchanger in the lubricating oil tank of the engine, a jacketed oil line leading from the oil tank to the engine, a heater manifold in communication with said housing receiving heated air and gases of combustion, said manifold extending in juxtaposition to the engine and having a plurality of air jets projecting therefrom adjacent the cylinders of the engine whereby the heated air and gases will impinge upon the surface of said cylinders, and auxiliary manifolds in communication with said heater manifold for conducting heated air to the heat exchanger in said lubricating oil tank and to the jacket of the jacketed oil line.

7. A heater comprising a burner nozzle for producing a fuel stream, a ring-like member having a central orifice adjacent said nozzle and arranged for the passage of the fuel stream through said orifice, an elongated tubular housing having one end thereof surrounding said member in spaced relation to provide a substantially annular passage and extending a substantial distance beyond said member in the direction of the fuel stream, and means for introducing a stream of air into said housing at the end where said member is located, said member being constructed and arranged to divide the air stream and to direct a portion thereof through said orifice to support combustion of the fuel stream, and provide a combustion zone adjacent the longitudinal axis of said housing and to direct the remainder of the air stream through said annular passage to provide a substantially annular air screen surrounding and in intimate contact with the combustion zone, said air screen providing the sole means intermediate the combustion zone and said housing for confining the combustion zone adjacent the longitudinal axis of said housing.

8. A heater comprising a housing providing a combustion space; a spray nozzle disposed at one end of the housing for atomizing liquid fuel; ignition means adjacent said nozzle; an air blower adjacent said end of the housing for directing a stream of high velocity air into the housing; a venturi supported in said end of the housing in the path of the air stream; said venturi having a central opening for the admission of air of combustion to the combustion space, and being spaced from the walls of the housing to provide an annular jet for the admission of air in the form of a tubular air screen surrounding and in intimate contact with the flame in the combustion space, the said air screen providing the sole means intermediate the combustion space and said housing for confining the flame in said space.

WILLIAM A. BULGER.

REFERENCES CITED

The following references are of record in the file of this patent:

UNITED STATES PATENTS

| Number | Name | Date |
|---|---|---|
| 1,225,775 | Garrett | Dec. 24, 1940 |
| 1,154,207 | Roberts | Sept. 21, 1915 |
| 2,180,663 | Bergeron | Nov. 21, 1939 |
| 1,213,820 | Bergman | Jan. 30, 1917 |
| 2,225,775 | Garrett | Dec. 24, 1940 |
| 2,078,116 | Arndt | Apr. 20, 1937 |
| 1,862,114 | Gilly | June 7, 1932 |
| 2,295,177 | King | Sept. 8, 1942 |
| 2,174,663 | Keller | Oct. 3, 1939 |
| 2,216,075 | Henderson | Sept. 24, 1940 |